United States Patent
Schoneboom et al.

(10) Patent No.: US 10,792,772 B2
(45) Date of Patent: Oct. 6, 2020

(54) HEAT EXCHANGER REPLACEMENT MOUNTING PIN AND DRILL JIG

(71) Applicants: DENSO International America, Inc., Southfield, MI (US); DENSO CORPORATION, Kariya, Aichi-pref. (JP)

(72) Inventors: Sean Schoneboom, Bronson, MI (US); Michael Wojdyla, Warren, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 48 days.

(21) Appl. No.: 16/037,620

(22) Filed: Jul. 17, 2018

(65) Prior Publication Data
US 2020/0023476 A1   Jan. 23, 2020

(51) Int. Cl.
  *B23P 15/26*   (2006.01)
  *B23P 6/00*   (2006.01)
  *F28F 9/00*   (2006.01)
(52) U.S. Cl.
  CPC ............... *B23P 15/26* (2013.01); *B23P 6/00* (2013.01); *F28F 9/002* (2013.01)
(58) Field of Classification Search
  CPC ........... B23B 47/28; B25B 11/02; F28F 9/002
  See application file for complete search history.

(56) References Cited

U.S. PATENT DOCUMENTS

| | | | | |
|---|---|---|---|---|
| 2,351,243 A * | 6/1944 | Vetter | ............... | B23B 47/28 408/97 |
| 4,937,039 A | 6/1990 | Balog et al. | | |
| 5,078,224 A * | 1/1992 | Attinger | ............... | B60K 11/04 165/67 |
| 5,139,080 A * | 8/1992 | Bolton | ............... | F28D 1/0435 165/149 |
| 5,174,004 A * | 12/1992 | King | ............... | B21D 39/02 269/155 |
| 5,297,176 A * | 3/1994 | Altman | ............... | G21C 5/06 376/364 |
| 5,613,550 A * | 3/1997 | Ashida | ............... | F28F 9/002 165/173 |
| 5,743,916 A * | 4/1998 | Greenberg | ............... | A61B 17/02 606/102 |
| 5,894,025 A | 4/1999 | Lee et al. | | |
| 5,894,628 A | 4/1999 | Egner-Walter et al. | | |
| 8,689,771 B2 | 4/2014 | Johnson et al. | | |

(Continued)

FOREIGN PATENT DOCUMENTS

| EP | 0211253 B1 * | 5/1989 | ............. F28F 9/002 |
|---|---|---|---|
| EP | 0870638 A1 | 10/1998 | |

(Continued)

*Primary Examiner* — Jacob J Cigna
(74) *Attorney, Agent, or Firm* — Harness, Dickey & Pierce, P.L.C.

(57) ABSTRACT

A heat exchanger replacement mounting pin and drill jig for replacing a broken mounting pin of a heat exchanger, which includes the following: a replacement mounting pin portion; a bore defined by the replacement mounting pin portion for guiding a drill to a mounting site of the heat exchanger; and a nut alignment portion extending from the replacement mounting pin portion.

11 Claims, 4 Drawing Sheets

(56) References Cited

U.S. PATENT DOCUMENTS

| | | | |
|---|---|---|---|
| 8,910,358 B2 * | 12/2014 | Piepenburg | F28F 9/007 269/155 |
| 9,398,726 B2 | 7/2016 | You et al. | |
| 2004/0089769 A1 * | 5/2004 | Carrier | B60K 11/04 248/71 |
| 2004/0142180 A1 | 7/2004 | Asai et al. | |
| 2005/0051309 A1 * | 3/2005 | Mori | F04D 29/582 165/121 |
| 2006/0285931 A1 * | 12/2006 | Dean | B23B 47/287 408/103 |
| 2007/0175518 A1 | 8/2007 | Vincent et al. | |
| 2007/0284076 A1 | 12/2007 | Lorenzo et al. | |
| 2010/0078149 A1 * | 4/2010 | Yoshimitsu | B60K 11/04 165/67 |
| 2011/0255928 A1 * | 10/2011 | Ferreras | B23B 47/28 408/115 B |
| 2012/0328390 A1 * | 12/2012 | Colpan | F25B 39/04 411/166 |
| 2013/0061994 A1 | 3/2013 | Kaylin | |
| 2015/0146375 A1 | 5/2015 | Lu et al. | |
| 2015/0146377 A1 | 5/2015 | You et al. | |
| 2015/0146380 A1 | 5/2015 | Lu et al. | |
| 2015/0314376 A1 | 11/2015 | Matsubara et al. | |
| 2017/0058752 A1 | 3/2017 | Wright et al. | |
| 2017/0059257 A1 * | 3/2017 | Wang | F28F 9/002 |

FOREIGN PATENT DOCUMENTS

| | | | |
|---|---|---|---|
| EP | 0938990 A1 * | 9/1999 | B60H 1/00507 |
| EP | 1205332 A1 | 5/2002 | |
| EP | D870638 B1 | 6/2002 | |
| FR | 2929560 B1 * | 12/2014 | B60K 11/04 |
| WO | 2007012435 A2 | 2/2007 | |
| WO | 2012102629 A1 | 8/2012 | |

\* cited by examiner

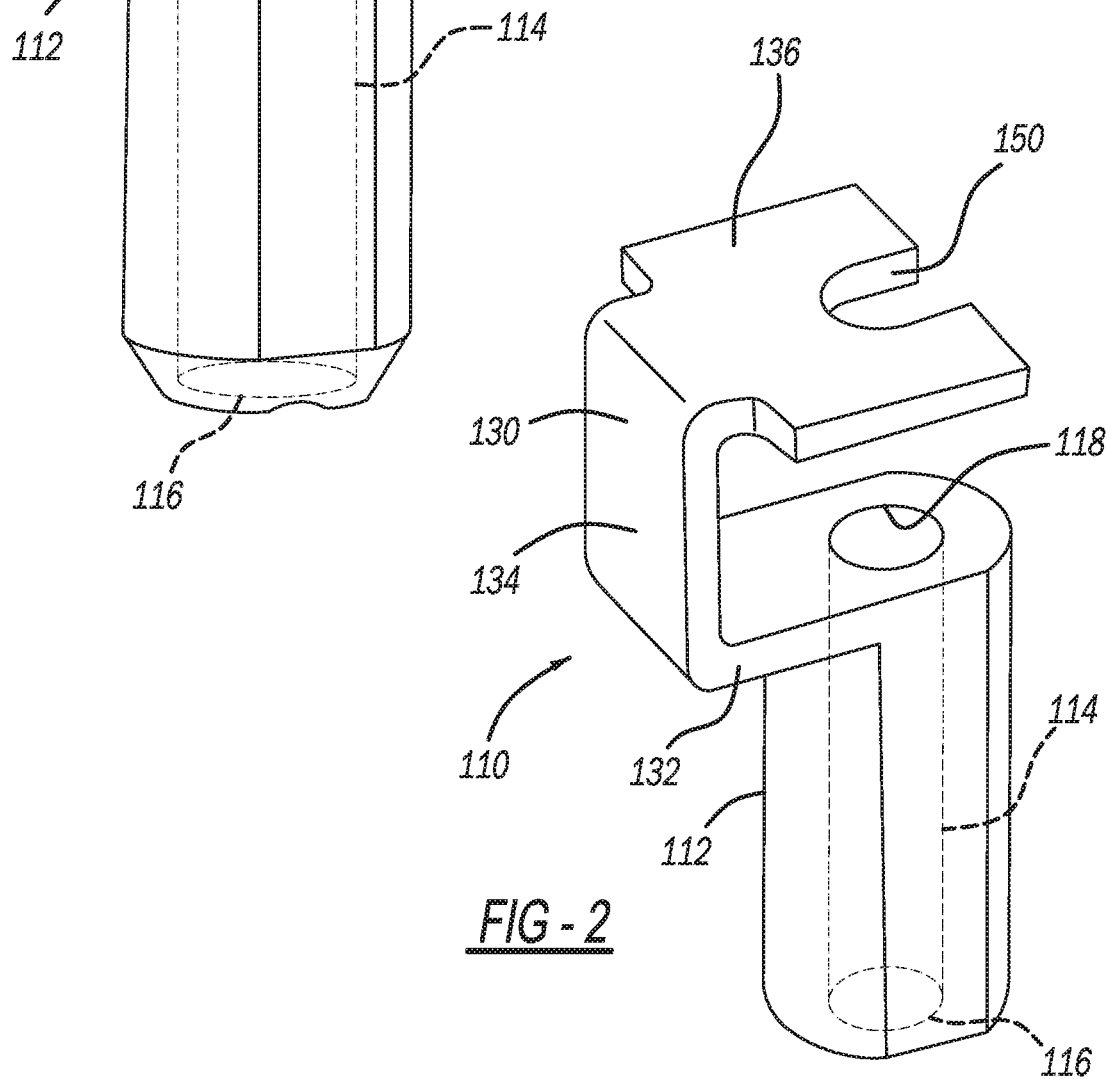

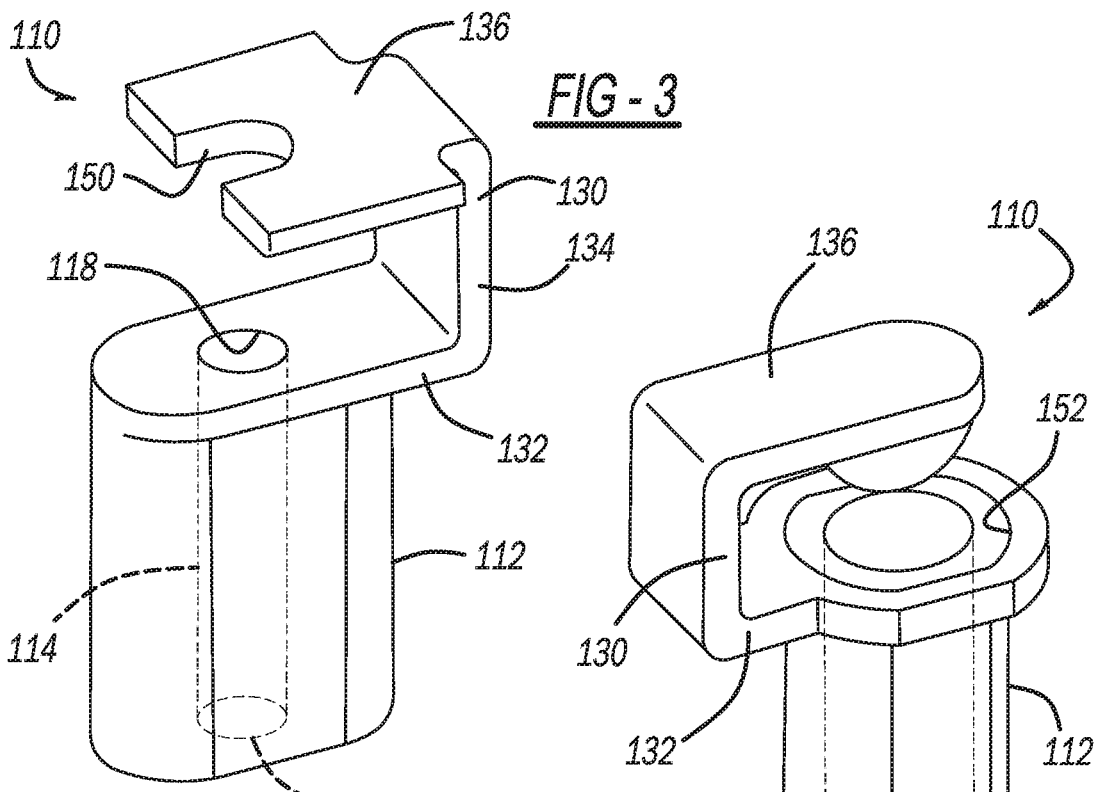
FIG-3
FIG-4
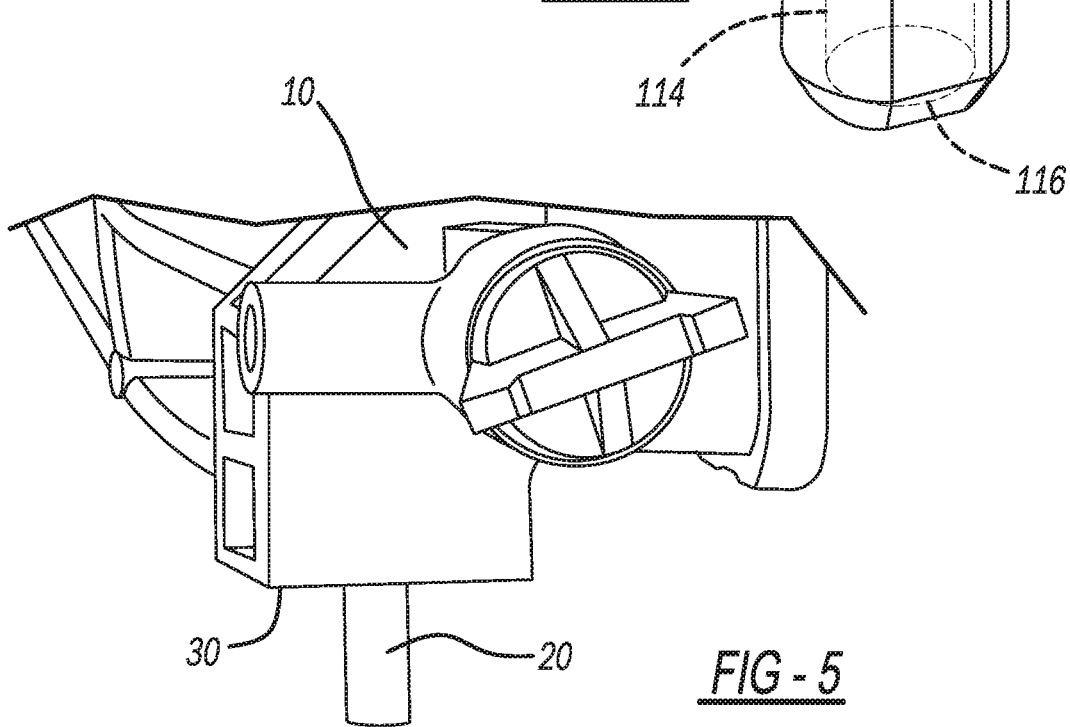
FIG-5

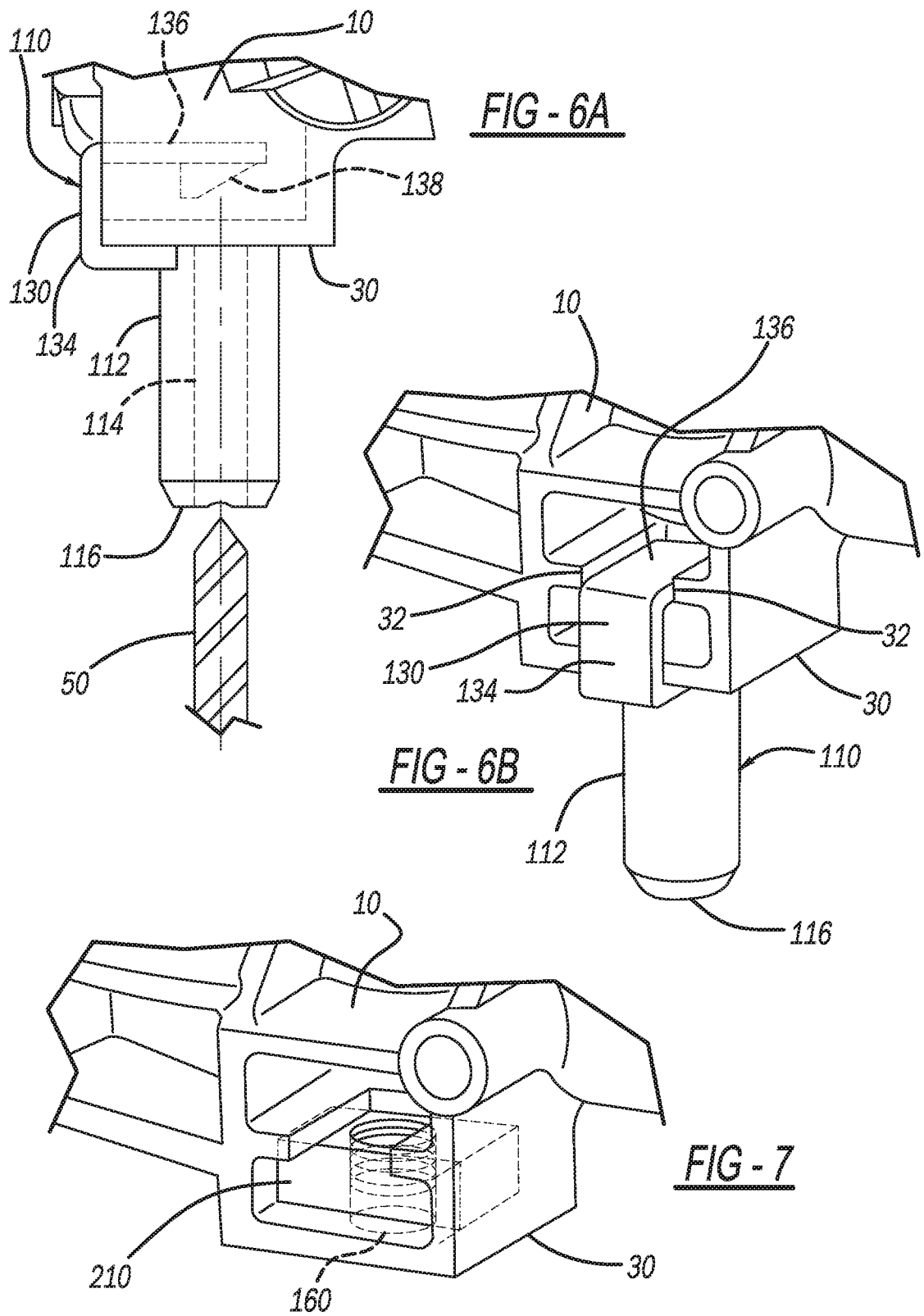

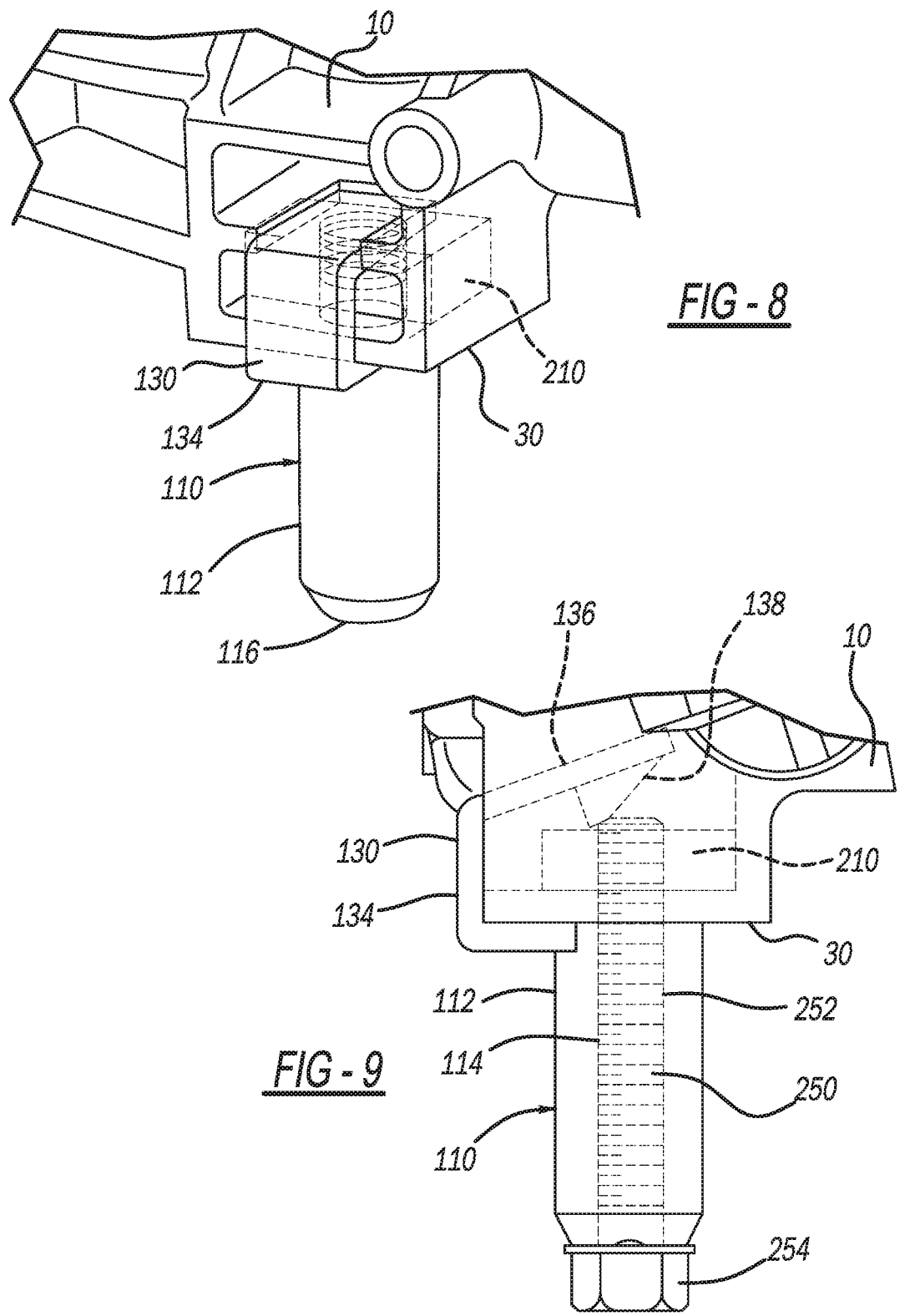

HEAT EXCHANGER REPLACEMENT MOUNTING PIN AND DRILL JIG

FIELD

The present disclosure relates to a heat exchanger replacement mounting pin and drill jig.

BACKGROUND

This section provides background information related to the present disclosure, which is not necessarily prior art.

Vehicle radiators are often secured in position at a front of a vehicle with pins, which extend from the radiator into a mounting location. The pins are typically configured as breakaway pins, which are designed to break away from the radiator in response to an impact of 5 mph or more to absorb energy and prevent the radiator from being punctured or otherwise broken. Current pins are typically molded to a mounting structure of the radiator, and when broken a new hole must be drilled to accommodate a new pin, which is typically secured with a nut and bolt arrangement. It is often difficult to drill the new hole and align the new pin, bolt, and nut, thus making the overall procedure time consuming and subject to failure. The present disclosure advantageously provides for a heat exchanger replacement mounting pin and drill jig for replacing a broken mounting pin of a heat exchanger that addresses these issues in the art, as well as numerous others as described herein and as one skilled in the art will appreciate.

SUMMARY

This section provides a general summary of the disclosure, and is not a comprehensive disclosure of its full scope or all of its features.

The present disclosure provides for a heat exchanger replacement mounting pin and drill jig for replacing a broken mounting pin of a heat exchanger, which includes the following: a replacement mounting pin portion; a bore defined by the replacement mounting pin portion for guiding a drill to a mounting site of the heat exchanger; and a nut alignment portion extending from the replacement mounting pin portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

FIG. 1 illustrates a heat exchanger replacement mounting pin and drill jig in accordance with the present disclosure;

FIG. 2 illustrates another heat exchanger replacement mounting pin and drill jig in accordance with the present disclosure;

FIG. 3 illustrates an additional heat exchanger replacement mounting pin and drill jig according to the present disclosure;

FIG. 4 illustrates yet another heat exchanger replacement mounting pin and drill jig in accordance with the present disclosure;

FIG. 5 illustrates a heat exchanger and a mounting pin thereof, which when broken is subsequently replaced by any of the heat exchanger replacement mounting pins and drill jigs in accordance with the present disclosure;

FIG. 6A is a side view of the heat exchanger replacement mounting pin and drill jig of FIG. 1 coupled to the heat exchanger for drilling a hole at a mounting site of the heat exchanger;

FIG. 6B is a perspective view of the heat exchanger replacement mounting pin and drill jig of FIG. 1 coupled to the heat exchanger for drilling the hole at the mounting site of the heat exchanger;

FIG. 7 illustrates the mounting site of the heat exchanger with a nut seated over a hole drilled by a drill guided to the mounting site of the heat exchanger by the heat exchanger replacement mounting pin and drill jig;

FIG. 8 illustrates the heat exchanger replacement mounting pin and drill jig of FIG. 1 coupled to the heat exchanger and nut; and FIG. 9 illustrates the heat exchanger replacement mounting pin and drill jig of FIG. 1 mounted to the heat exchanger with a bolt.

Corresponding reference numerals indicate corresponding parts throughout the several views of the drawings.

DETAILED DESCRIPTION

Example embodiments will now be described more fully with reference to the accompanying drawings.

FIG. 1 illustrates a heat exchanger replacement mounting pin and drill jig in accordance with the present disclosure at reference numeral 110 (often referred to herein as "the jig"). The jig 110 generally includes a replacement mounting pin portion 112 and a nut alignment portion 130. The replacement mounting pin portion 112 defines a bore 114 extending therethrough. The bore 114 has a first end or inlet 116, and a second end or outlet 118. The replacement mounting pin portion 112 may be generally circular as illustrated in FIGS. 1 and 2, oval as illustrated in FIG. 3, or have any other suitable shape.

The nut alignment portion 130 includes a base portion 132, which extends from the replacement mounting pin portion 112 perpendicular to a length of the bore 114. A side portion 134 extends perpendicular from the base portion 132, and a head portion 136 extends perpendicular from the side portion 134 such that the head portion 136 is opposite to the second end 118 of the bore 114. A nut engagement portion 138 extends from the head portion 136 towards the second end 118 of the bore 114. The nut alignment portion 130 is flexible to allow the head portion 136 to be flexed and pushed away from the second end 118 as described herein. With reference to FIG. 2, the head portion 136 may include a cut-out 150 instead of the nut engagement portion 138. The cut-out 150 provides a clearance for a bolt 250 inserted through the bore 114, and through a nut 210 arranged between the head portion 136 and the second end 118, as described herein.

The replacement mounting pin portion 112 and the nut alignment portion 130 may be integral, as illustrated in FIGS. 1-3, and made of any suitable material, such as a polymeric material. With reference to FIG. 4, the replacement mounting pin portion 112 and the nut alignment portion 130 may be modular. In the example of FIG. 4, the jig 110 defines a sleeve 152, through which the replacement mounting pin portion 112 is seated. When modular as illustrated in FIG. 4, the replacement mounting pin portion 112 may be made of any suitable metallic material, and the nut alignment portion 130 may be made of a polymeric material.

FIG. 5 illustrates an exemplary heat exchanger 10 including a mounting pin 20 at a mounting site 30. The pin 20 is subject to breaking off of the heat exchanger 10, thus requiring replacement. The jig 110 of the present disclosure advantageously can be used to replace the pin 20. For example and with reference to FIGS. 6A and 6B, the jig 110 is coupled to the mounting site 30 by inserting the head portion 136 into the mounting site 30 where sidewalls 32 of the heat exchanger 10 will make contact with the head portion 136 and the side portion 134 to locate the jig at the correct position of the mounting site 30 to drill a new hole therein.

With the jig 110 in place at the mounting site 30 as illustrated in FIGS. 6A and 6B, a drill bit 50 is inserted through the bore 114 to drill a hole 160 at the mounting site 30. FIG. 7 illustrates an exemplary hole 160 drilled by the drill bit 50 guided to the mounting site 30 by the jig 110. The jig 110 is then removed, and a nut 210 is inserted over the hole 160. With reference to FIG. 8, the jig 110 is then reattached at the mounting site 30 such that the nut 210 is arranged between the second end 118 of the bore 114 and the nut engagement portion 138. The jig 110 is positioned such that the bore 114 is aligned with the hole 160, and the nut engagement portion 138 cooperates with the nut 210 to position the nut 210 over the hole 160, and thus align the nut 210 with the bore 114.

With reference to FIG. 9, a bolt 250 is then inserted through the bore 114 such that a bolt shaft 252 thereof threads into the nut 210. As the bolt 250 is threaded into the nut 210, the bolt shaft 252 may protrude from an opposite side of the nut 210 and contact the nut engagement portion 138 to push the head portion 136 away from the nut 210. A head 254 of the bolt 250 is seated at the first end 116 of the bore 114.

Thus the heat exchanger replacement mounting pin and drill jig 110 of the present disclosure advantageously has a replacement mounting pin portion 112 that replaces the pin 20 (see FIG. 5) in the event that the pin 20 breaks away from the heat exchanger 10. The jig 110 doubles as a drill jig to drill the hole 160 and align the bore 114 with the nut 210 to facilitate insertion of the bolt 250 through the bore 114 and into cooperation with the nut 210 to secure the jig 110 to the heat exchanger 10. One skilled in the art will appreciate that the present disclosure provides numerous additional advantages and unexpected results.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A heat exchanger replacement mounting pin and drill jig for replacing a broken mounting pin of a heat exchanger comprising:

a replacement mounting pin portion;

a bore defined by the replacement mounting pin portion for guiding a drill to a mounting site of the heat exchanger; and a nut alignment portion extending from the replacement mounting pin portion for aligning a nut with the bore, the nut alignment portion is flexible and configured to be flexed by a bolt seated in the bore and in cooperation with the nut.

2. The heat exchanger replacement mounting pin and drill jig of claim 1, wherein the replacement mounting pin portion is circular.

3. The heat exchanger replacement mounting pin and drill jig of claim 1, wherein the replacement mounting pin portion is oval.

4. The heat exchanger replacement mounting pin and drill jig of claim 1, wherein the bore defines openings at opposite ends of the replacement mounting pin portion.

5. The heat exchanger replacement mounting pin and drill jig of claim 1, wherein the nut alignment portion includes a nut engagement portion aligned with, and spaced apart from, the bore.

6. The heat exchanger replacement mounting pin and drill jig of claim 1, wherein the nut alignment portion defines a cut-out for the bolt to pass therethrough.

7. The heat exchanger replacement mounting pin and drill jig of claim 1, wherein the replacement mounting pin portion and the nut alignment portion are monolithic and made of a polymeric material.

8. The heat exchanger replacement mounting pin and drill jig of claim 1, wherein the nut alignment portion includes a base portion extending from the replacement mounting pin portion perpendicular to a length of the bore, a side portion extending perpendicular from the base portion, and a head portion extending perpendicular from the side portion such that the head portion is opposite to the bore.

9. The heat exchanger replacement mounting pin and drill jig of claim 8, wherein the head portion includes a nut engagement portion opposite to the bore.

10. The heat exchanger replacement mounting pin and drill jig of claim 1, wherein the nut alignment portion defines a sleeve with the replacement mounting pin portion seated therein.

11. The heat exchanger replacement mounting pin and drill jig of claim 10, wherein the replacement mounting pin portion is metallic and the nut alignment portion is made of a polymer.

* * * * *